(12) United States Patent
Masato

(10) Patent No.: US 8,503,771 B2
(45) Date of Patent: Aug. 6, 2013

(54) METHOD AND APPARATUS FOR ESTIMATING LIGHT SOURCE

(75) Inventor: Kazui Masato, Yokohama (JP)

(73) Assignee: Samsung Techwin Co., Ltd., Changwon (KR)

( * ) Notice: Subject to any disclaimer, the term of this patent is extended or adjusted under 35 U.S.C. 154(b) by 26 days.

(21) Appl. No.: 13/331,719

(22) Filed: Dec. 20, 2011

(65) Prior Publication Data

US 2012/0155753 A1  Jun. 21, 2012

(30) Foreign Application Priority Data

Dec. 20, 2010 (JP) .................................. 2010-283123
Oct. 14, 2011 (KR) ......................... 10-2011-0105534

(51) Int. Cl.
*G06K 9/00* (2006.01)
(52) U.S. Cl.
USPC .......................................... 382/162; 382/165
(58) Field of Classification Search
USPC ................. 382/159, 162, 165, 191, 225, 274, 382/278, 286; 348/223.1, 227.1
See application file for complete search history.

(56) References Cited

U.S. PATENT DOCUMENTS

| | | | | |
|---|---|---|---|---|
| 4,992,963 A | * | 2/1991 | Funt et al. | 382/162 |
| 7,636,473 B2 | * | 12/2009 | Imai et al. | 382/167 |
| 7,999,978 B2 | * | 8/2011 | Nakamura et al. | 358/518 |
| 8,023,736 B2 | * | 9/2011 | Tsukada | 382/173 |

FOREIGN PATENT DOCUMENTS

| | | |
|---|---|---|
| JP | 3767541 B2 | 2/2006 |
| JP | 2008-072575 A | 3/2008 |
| KR | 10-2005-0074590 A | 7/2005 |
| KR | 10-2007-0099445 A | 10/2007 |

OTHER PUBLICATIONS

Brainard, David H. et al. "Bayesian color constancy." J. Opt. Soc. Am. A, vol. 14, No. 7. Jul. 1997. pp. 1393-1411.
Golz, Jurgen et al. "Influence of scene statistics on color constancy." Letters to Nature, vol. 415, Feb. 7, 2002. pp. 637-640.
Land, Edwin H. "Recent Advances in Retinex Theory." Vision Res. vol. 26, No. 1, 1986, Pergamon Press Ltd. pp. 7-21.

* cited by examiner

*Primary Examiner* — Phuoc Tran
(74) *Attorney, Agent, or Firm* — Sughrue Mion, PLLC

(57) ABSTRACT

A method and apparatus for estimating a light source in an image obtained by an image device are provided. The light source estimating apparatus includes: a brightness-color correlation calculator which calculates brightness-color correlation data from an image of an object generated from at least one image frame; a color balance calculator which calculates a color balance of an entire region of the image and a color balance of a neutral gray region of the image having an average color of gray; a characteristic data generating unit which generates characteristic data of the image based on the brightness-color correlation data, the color balance of the entire region and the color balance of the neutral gray region; and an identifier which determines a type of a light source in the image, based on the characteristic data of the image.

20 Claims, 10 Drawing Sheets

INPUT IMAGE

PLOT OF BRIGHTNESS-REDNESS CORRELATION

PLOT OF BRIGHTNESS-BLUENESS CORRELATION

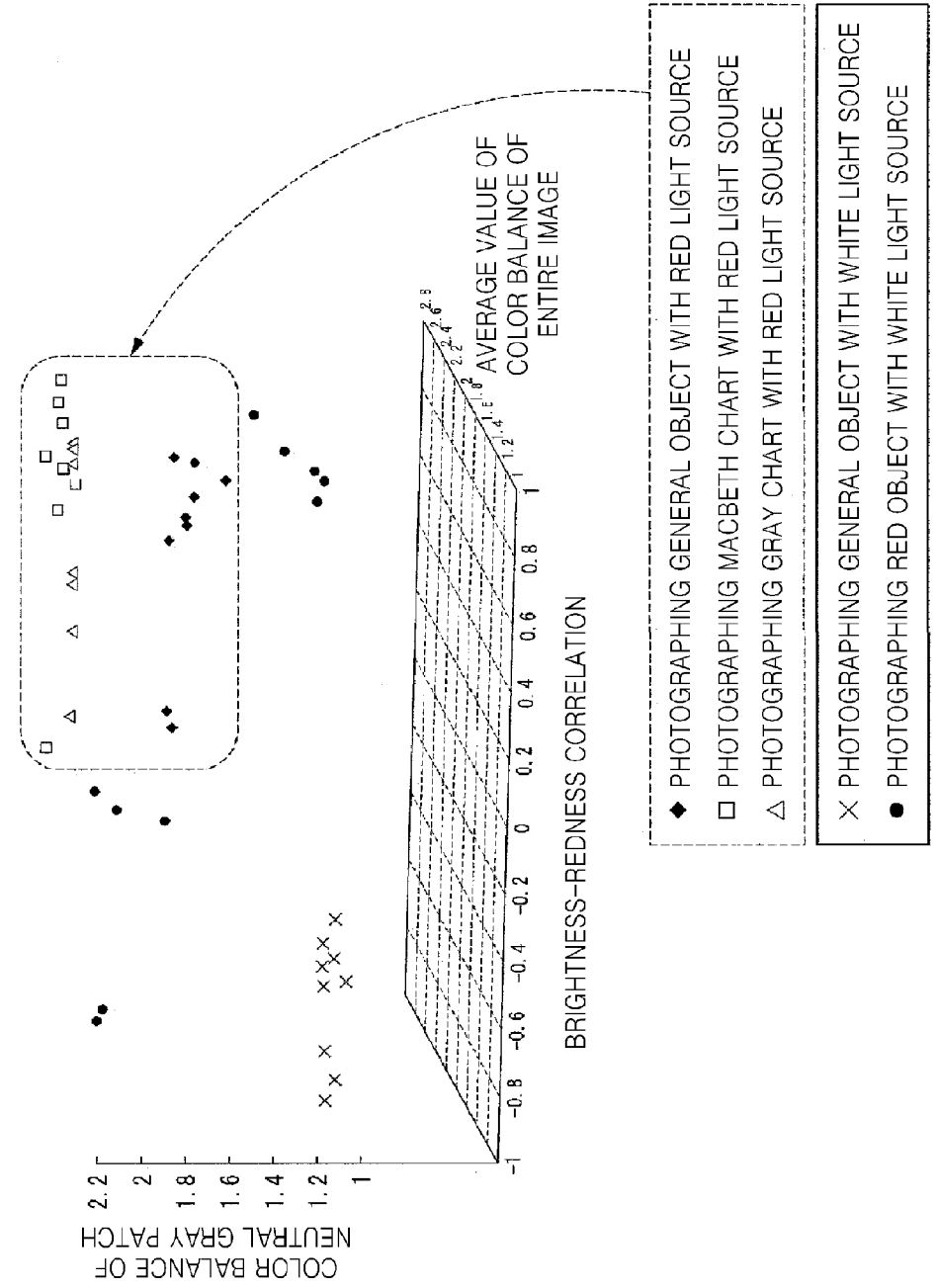

SPECTRUM WHEN LIGHT IS IRRADIATED TO GENERAL OBJECT FROM RED LIGHT SOURCE

SPECTRUM WHEN LIGHT IS IRRADIATED TO RED OBJECT FROM WHITE LIGHT SOURCE

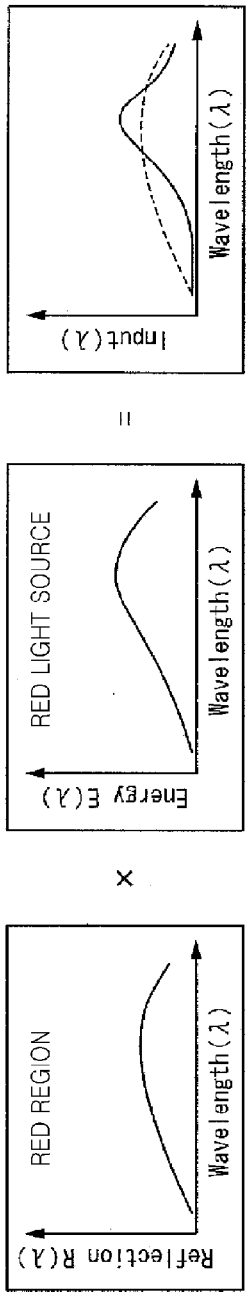
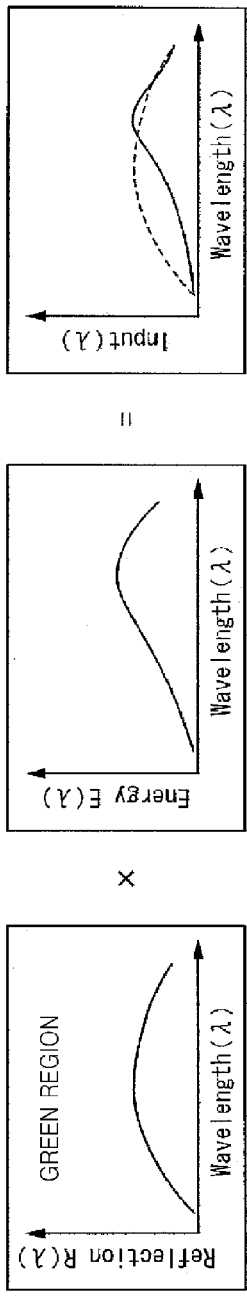
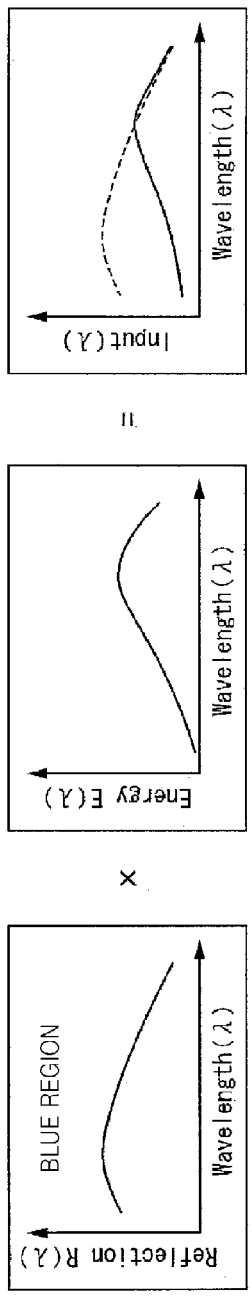
FIG. 10A SPECTRUM WHEN LIGHT IS IRRADIATED TO RED OBJECT FROM RED LIGHT SOURCE
FIG. 10B SPECTRUM WHEN LIGHT IS IRRADIATED TO GREEN OBJECT FROM RED LIGHT SOURCE
FIG. 10C SPECTRUM WHEN LIGHT IS IRRADIATED TO BLUE OBJECT FROM RED LIGHT SOURCE

METHOD AND APPARATUS FOR ESTIMATING LIGHT SOURCE

CROSS-REFERENCE TO RELATED PATENT APPLICATION

This application claims priority from Japanese Patent Application No. 2010-283123 filed Dec. 20, 2010 in the Japanese Patent Office, and Korean Patent Application No. 10-2011-0105534 filed Oct. 14, 2011 in the Korean Intellectual Property Office, the disclosures of which are incorporated herein in their entirety by reference.

BACKGROUND

1. Field

Methods and apparatuses consistent with exemplary embodiments relate to estimating a light source in an image obtained by an image device.

2. Description of the Related Art

The human color perception system ensures that a perceived color of objects remains relatively constant under varying illumination conditions. For example, white paper looks white in sunlight. The white paper looks orange under a halogen lamp since the halogen lamp is an orange light source. However, humans perceive that the white paper looks white also under the halogen lamp, like in sunlight. A feature of the human color perception system which ensures that the human perceives the original color of objects under varying illumination conditions is referred to as color constancy. The color constancy refers to white balance adjustment in an electronic photographing device such as a digital still camera or a digital video camera. The white balance adjustment is an adjustment among RGB color channels so that an object with achromatic color may look achromatic. The white balance adjustment is impossible without information about spectral characteristics of an original light source and an object surface. That is, spectral characteristics detected by the human eye are expressed by a product of a spectral reflective characteristic of a light source and that of an object surface. Since these two characteristics are unknown, problems may arise with the white balance adjustment. Thus, various algorithms by which color constancy is modeled by making an assumption or limitation with respect to a light source, an object surface, and a viewed scene have been suggested.

One of algorithms that have been frequency used to address color constancy is gray hypotheses (for example, refer to JP 3767541). The gray hypotheses is based on experience data in that an average color of various colors is close to gray since various colors are distributed in a general scene within a view. If the average color deviates from gray, it is determined that the deviation is caused by color of a light source. Based on this determination, white balance may be adjusted by performing adjustment between RGB color channels. This method may have low calculating costs, and may be easily used in an internal device such as a digital still camera. On the other hand, since it is assumed that an object is physically dependent upon a light source, this assumption is not right according to a scene, and thus, an estimating result of a light source may vary. For example, when a gray logo exists on a portion of a red wall, an average color of an image is red. Here, according to the gray hypothesis, it is determined that the red color is caused by color of a light source. Thus, in order to make an entire scene gray, an opposite color of the red color is applied to the entire scene. Thus, the logo having an original gray color is changed to the opposite color of the red color. This is referred to as color feria.

A method of estimating a light source by using spectral characteristics of a light source and an object surface has been suggested (for example, refer to D. H. Brainard & W. T. Freeman, "Baysian Color Constancy", J. Opt. Soc. Am. A, Vol. 14, No. 7, 1997). The method may statistically increase accuracy of estimating a light source by expressing the spectral characteristics of the light source and the object surface on an orthogonal basis with a low difference therebetween and making an assumption or limitation with respect to the light source, the object surface, and a photographing system, or combining information about the light source, the object surface, and the photographing system. When this method is used, the light source may be estimated in detail. However, since the number of calculating operations is increased, when the method is used to perform calculation for an image process such as a white balance process in a digital camera, it may be difficult to perform the process in real time.

As a method of estimating a type of light source in consideration with spectral characteristic of the light source and object surface while reducing calculating costs, a brightness-color correlation method has been suggested (for example, refer to J. Golz & D. I. A. Macleod, "Influence of scene statistics on color constancy", NATURE, VOL. 415, 7, FEBRUARY, 2002). In this method, when a light source is red (which is the same as in cases where the light source is green or blue), it is determined whether the light source is white or not by using correlation in that a red color of a red region deepens. With reference to FIGS. 9 and 10, the brightness-color correlation will be described. FIGS. 9 and 10 are schematic diagrams of spectral distribution for showing brightness-color correlation. In FIGS. 9 and 10, a vertical axis denotes a wavelength, and a horizontal axis denotes energy corresponding to respective wavelength. FIG. 9A is a schematic diagram for showing, from a left side, spectral distribution of an image of a general object X including various colors, spectral distribution of a red light source (Lr) irradiating light to the object X, and spectral distribution of an image captured by irradiating light to the object X from the red light source Lr. In FIG. 9A, intensities of spectrums of images are reduced towards a short wavelength (i.e., blue) and are increased towards a long wavelength (i.e., red). That is, images that are captured by irradiating light from the red light source have a correlation in that a red degree of a region is increased as the region becomes brighter. This correlation is appropriate when a plurality of colors exist in an image. FIG. 9B is a schematic diagram for showing, from a left side, spectral distribution of an image of a red object Xr, spectral distribution of a white light source Lh (for example, a light source having a color temperature of 5,500 K) irradiating light to the object Xr, and spectral distribution of an image captured by irradiating light from the white light source Lh. Since the spectrum distribution of the white light source is flat, spectrum distribution of an object itself is detected. Thus, brightness and color has no correlation. In addition, this correlation may be applied to a blue degree as well as a red degree.

FIGS. 10A through 10C are schematic diagrams for showing spectrum distribution when light is irradiated from a red light source. FIG. 10A is a schematic diagram for showing, from a left side, spectral distribution of an image of a red region Sr, spectral distribution of a light source Lr irradiating light to the red region Sr, and spectral distribution of an image captured by irradiating light to the red region Sr from the red light Lr. FIG. 10B is a schematic diagram for showing, from a left side, spectral distribution of an image of a green region Sg, spectral distribution of a red light source Lr irradiating light to the green region Sg, and spectral distribution of an image captured by irradiating light to the green region Sg from the red light source Lr. FIG. 10C is a schematic diagram for showing, from a left side, spectral distribution of an image of a blue region Sb, spectral distribution of a red light source Lr irradiating light to the blue region Sb, and spectral distribution of an image captured by irradiating light to the blue region Sb from the red light source Lr. Since a long wavelength has low energy, when light is irradiated to the blue region Sb from the red light source Lr, the blue region Sb is darker than a case where light is irradiated to the red region Sr from the red light source Lr. Energy around a short wavelength of reflective light in the blue region Sb is reduced. However, the blue region Sb has more short wavelength components than a case where red light is irradiated to the red region Sr (this is because the blue region has a wide spectrum around a short wavelength). That is, there is negative correlation in that blue deepens as it becomes darker. So far, the "brightness-color correlation" has been described.

According to this method, overall characteristics of a light source (white or nonwhite) may be estimated by using a small number of calculating operations. This is because the detailed spectral characteristics do not have to be considered compared to the above-described method using spectral reflective characteristics. Thus, this method has a sufficient performance for overcoming problems with color feria and has low calculating costs. Thus, this method may be effectively used in an internal device.

In addition, JP 3767541 discloses a method of estimating spectral characteristics indicating colors of a light source irradiating light to an object from response values of sensors having different spectral sensitivity characteristics.

However, the above-described brightness-color correlation is affected by a degree of texture of an image, which is generated by a position of a camera or an intensity of a light source. For example, when the texture of the image is flat and the number of colors is small, since input data distribution of brightness and color is not spread out, the brightness-color correlation may be unstable. In a real environment, the influence that causes this problem needs to be reduced in order to stably perform estimation of a light source.

Since the brightness-color correlation is based on an assumption that input data distribution is normal distribution, when the number of input data is small or data has an outlier, the assumption is not appropriate, and thus, correct brightness-color correlation may not be calculated. In addition, some pixels look white due to specular reflection of an object. Thus, in a scene including a highlight region, the pixels correspond to outliers, and thus, the brightness-color correlation may be unstable.

In addition, in JP 3767541, the number of calculation operations is increased in order to estimating spectral characteristics indicating color of a light source based on a response value of a sensor. In addition, an imaging device needs to include sensors having different spectral sensitivity characteristics.

SUMMARY

One or more exemplary embodiments provide a method and apparatus for estimating a light source, by which a type of the light source may be very accurately calculated by using a small number of calculating operations, even if color textures of an image is flat and the number of colors is small.

According to an aspect of an exemplary embodiment, there is provided a light source estimating apparatus which may include: a brightness-color correlation calculator which calculates brightness-color correlation data from an image of an object generated from at least one image frame; a color balance calculator which calculates a color balance of an entire region of the image and a color balance of a neutral gray region of the image having an average color of gray; a characteristic data generating unit which generates characteristic data of the image based on the brightness-color correlation data, the color balance of the entire region and the color balance of the neutral gray region; and an identifier which determines a type of a light source in the image, based on the characteristic data of the image.

That is, the type of the light source may be determined according to the color balance of the entire region of the image, and the color balance of a neutral gray region in addition to the correlation data between brightness and color. Thus, even if color textures of the image are flat and the number of colors is small, the type of the light source may be very accurately calculated by using a small number of calculating operations.

The light source estimating apparatus may further include a texture analyzing unit which calculates a color texture characteristic indicating color diversity of the image, wherein the characteristic data generating unit generates the characteristic data of the image based on the color texture characteristic of the image.

That is, the type of the light source may be determined according to the color texture characteristic in addition to the correlation data between brightness and color, the color balance of the entire region of the image, and the color balance of the neutral gray region, and thus, the type of the light source may be very accurately calculated.

The light source estimating apparatus may further include a brightness irregularity analyzer which specifies a constant brightness region having constant brightness in the image, wherein the brightness-color correlation calculator calculates the brightness-color correlation data in the constant brightness region in the image.

That is, since the brightness-color correlation data is calculated in the constant brightness region, the brightness-color correlation data may be calculated rather than being dependent upon the position and intensity of the light source, thereby reducing color feria.

The light source estimating apparatus may further include a time sequence data buffer for sequentially storing a plurality of images generated by an imaging device, wherein the brightness-color correlation calculator calculates the brightness-color correlation data from the plurality of images that are stored in time sequence.

That is, since the brightness-color correlation data is calculated by using the plurality of images, the brightness-color correlation data may be very accurately calculated. In addition, time sequence data is used to correspond to a temporal change in image information, which is caused by shake, a change in motion of an object in a scene, and a change in illumination.

The identifier may include a learning unit which learns a determination basis for extracting the type of the light source from the characteristic data of the image, based on learning data including learned characteristic data of a plurality of model images and types of light sources corresponding to the plurality of model images, respectively; and an identifying unit which determines the type of the light source corresponding to the characteristic data of the image, based on a result of the learning by the learning unit.

That is, since the type of the light source is determined based on a result of the learning, a determination basis for extracting the type of the light source from the characteristic data does not have to be set in a manual.

According to an aspect of another exemplary embodiment, there is provided a method of estimating a light source, the method including: calculating brightness-color correlation data from an image of an object generated from at least one image frame; calculating a color balance of an entire region of the image and a color balance of a natural gray region of the image having an average color or gray; generating characteristic data of the image based on the brightness-color correlation data, the color balance of the entire region and the color balance of the neutral gray region; and determining a type of a light source in the image, based on the characteristic data of the image.

The method may further include calculating a color texture characteristic indicating color diversity of the image, wherein the characteristic data is generated further based on the color texture characteristic.

The method may further include specifying a constant brightness region having constant brightness in the image, wherein the brightness-color correlation data is calculated with respect to the constant brightness region.

The brightness-color correlation data may be calculated from the image of the object generated from a plurality of image frames obtained sequentially with respect to the same object.

The determining the type of the light source in the image may include: learning a determination basis for extracting the type of the light source from the characteristic data of the image, based on learning data including learned characteristic data of a plurality of model images and types of light sources corresponding to the plurality of images, respectively; and determining the type of the light source corresponding to the characteristic data of the image, based on a result of the learning.

BRIEF DESCRIPTION OF THE DRAWINGS

The above and other aspects will become more apparent by describing in detail exemplary embodiments with reference to the attached drawings, in which:

FIG. 8 is a graph showing three-dimensional plots of a characteristic vector, according to an exemplary embodiment;

FIG. 10 is another schematic diagram of spectral distribution for showing brightness-color correlation, according to an exemplary embodiment.

DETAILED DESCRIPTION OF THE EXEMPLARY EMBODIMENTS

Hereinafter, exemplary embodiments will be described in detail with reference to the attached drawings.

Figure 1:
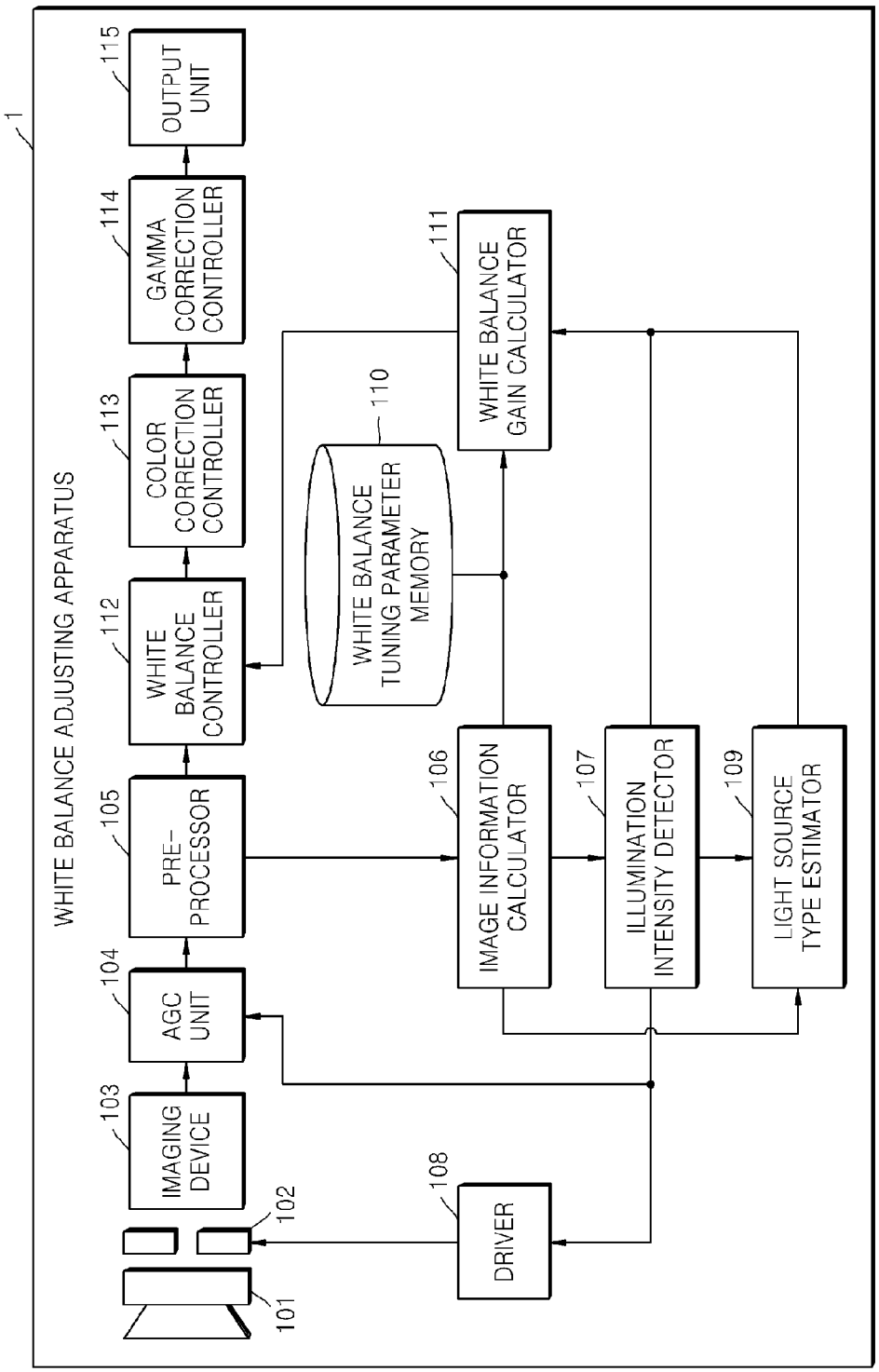
FIG. 1 is a block diagram of a white balance adjusting apparatus according to an exemplary embodiment.

FIG. 1 is a block diagram of a white balance adjusting apparatus 1 according to an exemplary embodiment.

The white balance adjusting apparatus 1 is an apparatus for adjusting white balance of an image signal in a device that converts an optical image of an object of a digital video camera, a digital still camera, or a portable terminal containing a camera and outputs the image signal. The white balance adjusting apparatus 1 includes a lens 101, an iris 102, an imaging device 103, an automatic gain control (AGC) unit 104, a preprocessor 105, an image information calculator 106, an illumination intensity detector 107, a driver 108, a light source type estimator 109, a white balance gain calculator 111, a white balance controller 112, a color correction controller 113, a gamma correction controller 114, and an output unit 115.

The lens 101 forms an optical image on a receiving surface of the imaging device 103. The iris 102 adjusts light that is output from the lens 101 to the imaging device 103. The imaging device 103 performs photoelectric transformation on the optical image formed on the receiving surface to generate an image signal, and outputs the image signal to the AGC unit 104. The AGC unit 104 uniformizes a level of the image signal according to an illumination intensity detected by the illumination intensity detector 107, and outputs the image signal whose level is uniformized to the preprocessor 105. The preprocessor 105 performs preprocesses such as noise removal, error correction, and shading correction on the input image signal, and outputs the image signal to the image information calculator 106 and the white balance controller 112.

The image information calculator 106 compresses or reduces the input image signal, which is preprocessed by the preprocessor 105, to generate a compressed image signal for calculating white balance, and outputs the compressed image signal to the illumination intensity detector 107, the light source type estimator 109, and the white balance gain calculator 111. The illumination intensity detector 107 calculates an illumination intensity used to perform an exposure process according to the input compressed image signal, and outputs the calculated illumination intensity to the AGC unit 104, the driver 108, and the white balance gain calculator 111. The driver 108 drives the iris 102 and controls exposure according to the input illumination intensity.

The light source type estimator (i.e., a light source estimating device) 109 calculates an image characteristic amount (a characteristic vector) by using the input compressed image signal according to 'brightness-color correlation' principle, and determines whether a type of a light source is a white-based light source or a nonwhite-based light source. The light source type estimator 109 outputs a result of the determining to the white balance gain calculator 111. The light source type estimator 109 will be described in detail later below.

The white balance gain calculator 111 calculates a white balance gain based on the type of the light source determined by the light source type estimator 109 and the illumination intensity detected by the illumination intensity detector 107. In detail, the white balance gain calculator 111 reads a white balance gain corresponding to the type of the light source from a white balance tuning parameter memory 110, and outputs the white balance gain to the white balance controller 112. The white balance tuning parameter memory 110 stores at least one white balance tuning parameter indicating a white balance gain that is optimized for each respective type of light sources including the light source.

According to the present embodiment, the white balance gain calculator 111 calculates a white balance gain based on the white balance tuning parameter. Alternatively, the white balance gain may be calculated by using a general white balance calculation algorithm. For example, the white balance gain calculator 111 calculates the white balance gain to have gray as a color balance when a color of the compressed image output from the image information calculator 106 is a color of the light source, and calculates the white balance gain without correcting the color when the color of the compressed image is not the color of the light source.

Since this method does not have to change an original white balance algorithm, this method is very systematically friendly. Another example will now be described. If a type of a light source is capable of being estimated, a range of brightness values may be limited when each respective light source emits light. Thus, the range of brightness values as a parameter may be used to calculate a white balance gain. The general white balance calculating algorithm includes logic for estimating a type of a light source according to the brightness values. However, since the lens 101 and a body (hereinafter, referred to as the imaging device 103) may not communicate with each other according to a type of a camera system, the brightness values may not be obtained, and may affect accuracy of white balance calculation. According to the present embodiment, since the type of a light source may be estimated, the range of brightness values may be estimated, accuracy of the white balance calculation may not deteriorate.

The white balance controller 112 adjusts white balance of the image signal input from the preprocessor 105, based on the input white balance gain. In addition, the white balance controller 112 outputs the image signal whose white balance is adjusted to the color correction controller 113. The color correction controller 113 corrects a color of the input image signal and outputs the image signal whose color is corrected to the gamma correction controller 114. The gamma correction controller 114 performs gamma correction on the input image signal, and outputs the input image signal to the output unit 115. The output unit 115 outputs the input image signal to an external recording medium, a display, a network, or the like.

Figure 2:
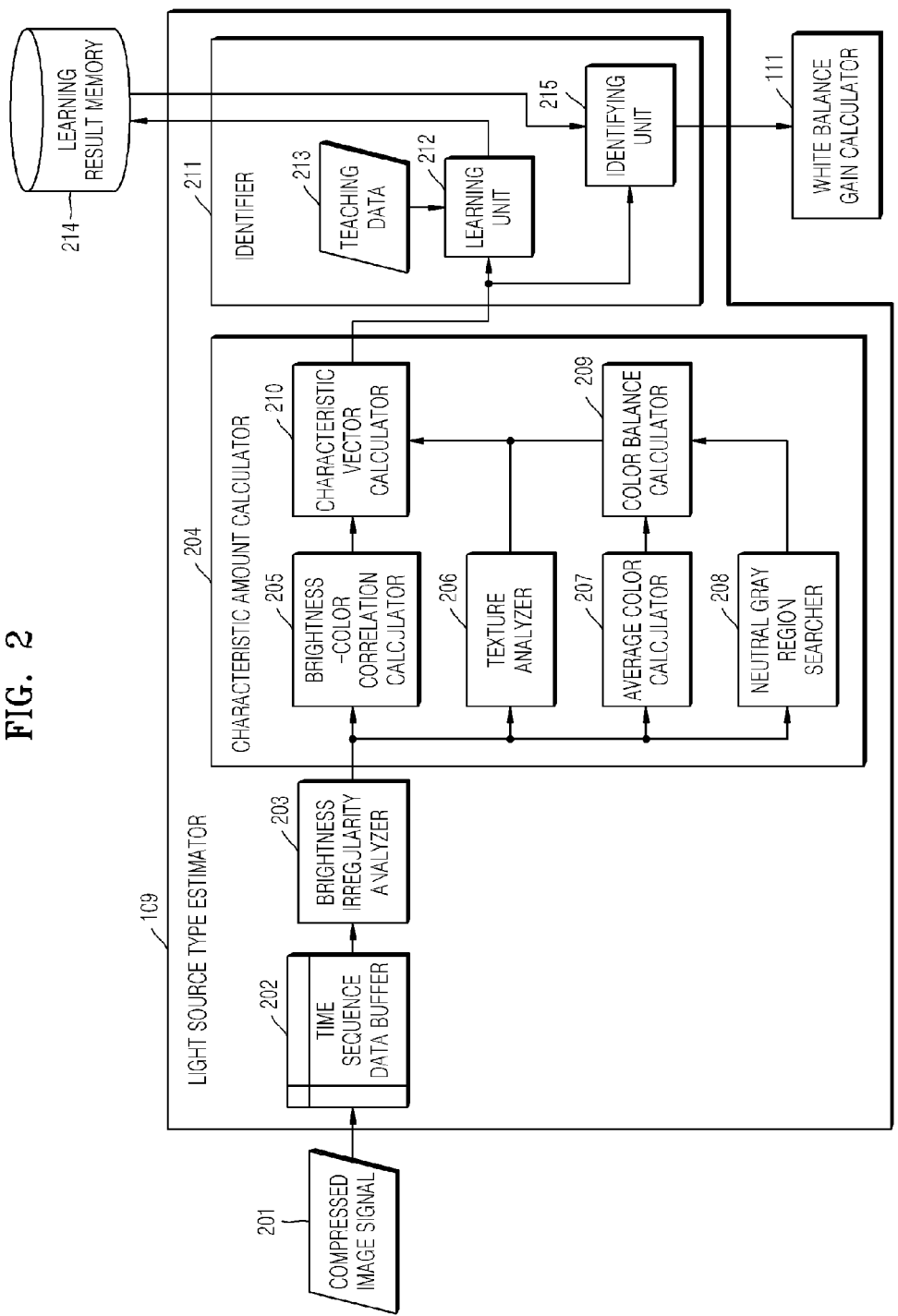
FIG. 2 is a functional block diagram of a light source type estimator of FIG. 1, according to an exemplary embodiment.

FIG. 2 is a functional block diagram of the light source type estimator 109 of FIG. 1, according to an exemplary embodiment.

The light source type estimator 109 includes a time sequence data buffer 202, a brightness irregularity analyzer 203, a characteristic amount calculator 204, and an identifier 211.

The time sequence data buffer 202 receives a compressed image signal 201 as an input and stores image data (hereinafter, referred to as compressed image data) of the compressed image signal 201 for each respective frame in a time sequence. The time sequence data buffer 202 may be a ring buffer included in a flash memory such as a dynamic random access memory (DRAM), and may store the compressed image data having a predetermined number of frames. The compressed image data stored in the time sequence data buffer 202 is sequentially input to the brightness irregularity analyzer 203.

The brightness irregularity analyzer 203 specifies a constant brightness region and a highlight pixel in units of frames. The constant brightness region has a constant brightness regardless of a position of a light source. The highlight pixel is an extremely bright pixel obtained according to a dichromatic reflection model (for example, refer to S. A. Shafer, "Using color to separate reflection components," in COLOR Research and Application, Vol. 10, No. 4, pp. 210-218, 1985). In addition, the brightness irregularity analyzer 203 outputs brightness irregularity information that is information about a constant brightness region, highlight pixel information that is information (coordinates) about the highlight pixel, and the compressed image data to the characteristic amount calculator 204. A process performed in the brightness irregularity analyzer 203 will be described later in detail.

The characteristic amount calculator 204 calculates a characteristic amount (hereinafter, referred to as a characteristic vector) for determining the type of the light source in the compressed image data, and outputs the calculated characteristic amount to the identifier 211. The characteristic amount calculator 204 includes a brightness-color correlation calculator 205, a texture analyzer 206, an average color calculator 207, a neutral gray region searcher 208, a color balance calculator 209, and a characteristic vector calculator 210.

The brightness-color correlation calculator 205 calculates a brightness-color correlation coefficient indicating correlation between brightness and color according to the compressed image data, the brightness irregularity information corresponding to respective compressed image data, and the highlight pixel information corresponding to the respective compressed image data of K (where K is an integer equal to or greater than 2) frames that are input in a time sequence. The brightness-color correlation coefficient is a characteristic vector for very accurately estimating the type of the light source with respect to an image having a great number of color textures (i.e., a great number of colors). The brightness-color correlation calculator 205 outputs the calculated brightness-color correlation coefficient to the characteristic vector calculator 210. A process performed in the brightness-color correlation calculator 205 will be described later in detail.

The texture analyzer 206 extracts a color texture characteristic from the compressed image data of the K frames that are input in a time sequence, and outputs the calculated color texture characteristic to the characteristic vector calculator 210. The color texture characteristic is an indicator of color diversity. A process performed in the texture analyzer 206 will be described later in detail.

The average color calculator 207 calculates an average color of each respective RGB channel in the compressed image data, and outputs the average color and the compressed image data to the color balance calculator 209. The neutral gray region searcher 208 searches for a neutral gray region in the compressed image data, and determines whether there is the neutral gray region in the compressed image data. The neutral gray region is a region having gray as an average color. In addition, the neutral gray region searcher 208 outputs information regarding the presence of the neutral gray region and the compressed image data to the color balance calculator 209.

The color balance calculator 209 calculates a color balance of an entire image in the compressed image data from the average color of each respective RGB channel, which is calculated by the average color calculator 207. The color balance calculator 209 calculates a color balance of the neutral gray region searched for by the neutral gray region searcher 208. The color balance calculator 209 outputs the color balance of the entire image and the color balance of the neutral gray region to the characteristic vector calculator 210. A method of calculating the color balance will be described later in detail. A set of the color balance of the entire image and the color balance of the neutral gray region is a characteristic amount for very accurately estimating the type of the light source with respect to an image having a small number of color textures.

The characteristic vector calculator 210 generates a characteristic vector (brightness-color correlation, color texture characteristic, color balance of an entire image and color balance of a neutral gray region) based on the brightness-color correlation coefficient calculated by the brightness-color correlation calculator 205, the color texture characteristic extracted by the texture analyzer 206 and the color balance calculated by the color balance calculator 209, and outputs the characteristic vector to a learning unit 212 or an identifying unit 215 of the identifier 211.

The identifier 211 machine-learns and stores a determination basis for extracting the type of the light source from the characteristic vector, based on learning data including characteristic vectors of various image data and types (i.e., teaching data) of various light sources respectively corresponding to various image data. Here, the identifier 211 performs machine learning by using boosting, a support vector machine (SVM), a decision tree, a random forest obtained by expanding decision tree, or the like. In addition, the identifier 211 determines the type of the light source corresponding to the characteristic vector input by the characteristic amount calculator 204 based on a result of the machine learning. The identifier 211 includes the learning unit 212 and the identifying unit 215. According to the present embodiment, the identifier 211 performs the machine learning. Alternatively, the identifier 211 may determine the type of the light source based on the determination basis by manual manipulation, for example.

The learning unit 212 machine-learns the determination basis for extracting a type of a light source based on learning data and stores a result of the machine learning in a learning result memory 214. The learning result memory 214 may be an external memory device installed outside the white balance adjusting apparatus 1, and stores the result of the machine learning, that is the learning data, in the learning result memory by the learning unit 212. When the learning unit 212 performs a process of estimating a type of a light source followed by learning, the learning unit 212 stores a result of the learning in a flash memory, or the like, which is installed inside the white balance adjusting apparatus 1.

The identifying unit 215 determines the type of the light source corresponding to the characteristic vector input by the characteristic vector calculator 210, based on the learning result of the learning unit 212, and outputs the determining result to the white balance gain calculator 111. For example, when a characteristic vector (brightness-color correlation, color texture characteristic, color balance of an entire image, and color balance of a neutral gray region) has a high color texture characteristic (a great number of color textures), the identifying unit 215 puts more weight on the brightness-color correlation than the others to determine the type of the light source. When the characteristic vector has low color texture characteristic (a small number of color textures), the identifying unit 215 puts more weight on the color balance of the entire image and the color balance of the neutral gray region to determine the type of the light source.

Figure 3:
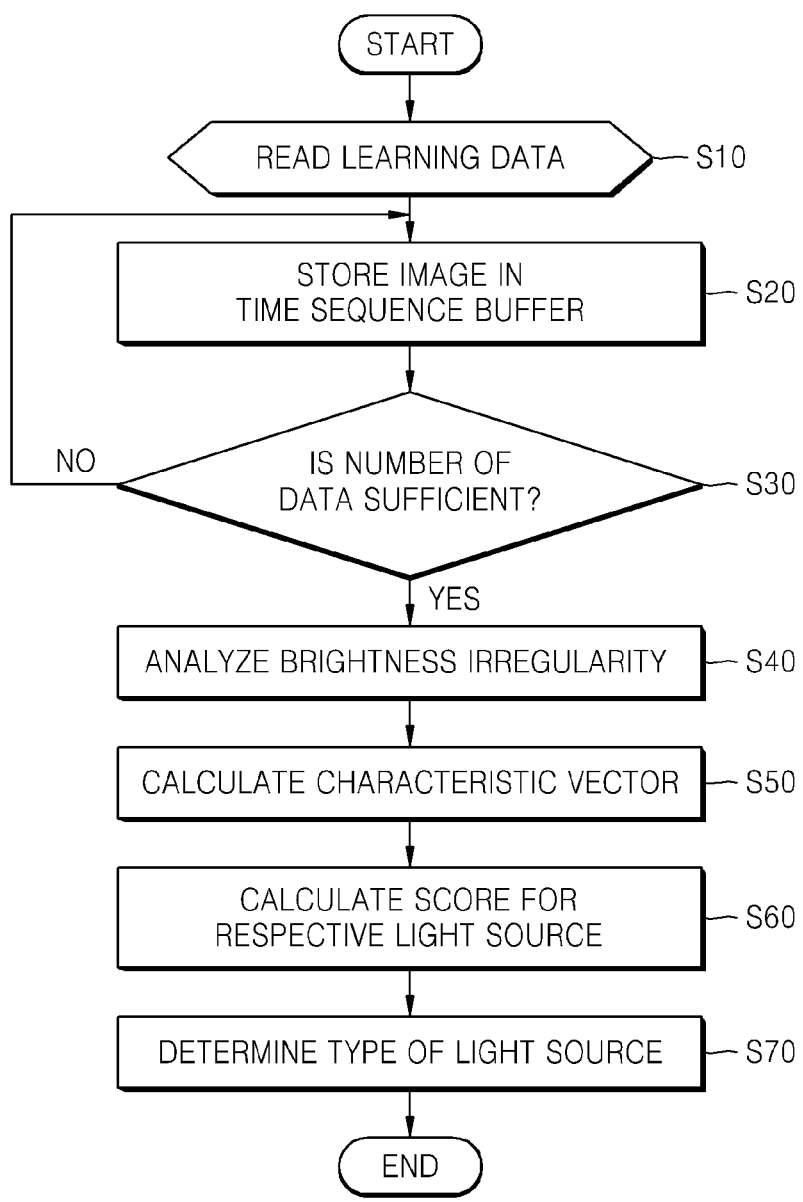
FIG. 3 is a flowchart of a process of estimating a type of light source, according to an exemplary embodiment

With reference to FIG. 3, the process of estimating the type of the light source, which is performed by the light source type estimator 109, will be described below. FIG. 3 is a flowchart of a process of estimating a type of a light source in an image data, according to an exemplary embodiment.

The identifying unit 215 reads the learning result from the learning result memory 214 (operation S10). Then, the light source type estimator 109 stores the compressed image data in the time sequence data buffer 202 (operation S20).

Then, the light source type estimator 109 determines whether the number of the compressed image data stored in the time sequence data buffer 202 is equal to or greater than a predetermined threshold value (operation S30). When the number of the compressed image data is equal to or greater than the threshold value, operation S40 is performed. When the number of the compressed image data is less than the threshold value, the process returns to operation S20. This conditional operation is performed to obtain a sufficient number of image data for stably calculating a brightness-color correlation coefficient as described below.

Then, the brightness irregularity analyzer 203 specifies a constant brightness region and a highlight pixel in units of frames by analyzing a brightness irregularity (operation S40). In detail, the brightness irregularity analyzer 203 specifies the constant brightness region by using the following approximate method. The brightness irregularity is dependent upon a position of a light source, and shapes and arrangements of objects. Thus, in the approximate method, it is assumed that light sources are located at eight positions which are indicated by using horizontal and vertical directions with respect to the front of a light source, that a depth of an object is sufficiently small compared to a distance between a camera and the object, and that illumination densities are constant in an image in any one direction from among horizontal, vertical, and inclined directions, and then, the constant brightness region is specified.

The inventive concept is not limited to this approximate method, and the constant brightness region may be specified by using another approximate method. For example, an approximate method of dividing an image region may be used. In the method of dividing an image region, a shadow region and a white region obtained by specular reflection are separated from each other, and only a region with a constant brightness level is used. The shadow region may be obtained by clustering color or brightness. The white region obtained by specular reflection may be estimated by using, for example, a dichromatic reflection model. In addition, these two approximate methods may be used together.

Then, the characteristic amount calculator 204 calculates the characteristic vector for determining the type of the light source based on brightness irregularity information that is information about the constant brightness region, highlight pixel information, and compressed image data (operation S50). A process of calculating the characteristic vector will be descried in detail later below.

Then, a score of the characteristic vector calculated based on the learning result read by the identifying unit 215 is calculated for a respective type of a light source (operation S60). In addition, the identifying unit 215 determines the type of the light source in the image data based on the score calculated for each respective type of light sources (operation S70). In detail, the identifying unit 215 determines a type of a light source with a high score, for example, the highest score, as the type of the light source in the image data corresponding to the characteristic vector. Here, the identifying unit 215 may determine the type of the light source by comparing the characteristic vector of the image data with learned characteristic vectors of a plurality of model images, select a learned characteristic vector of a model image most similar to the characteristic vector of the image data, and determine a type of a light source corresponding to the selected learned characteristic vector of the model image as the type of the light source in the image. After determining the type of the light source, the characteristic vector of the image data becomes a part of the learning result or learning data stored in the learning result memory 214 which will be used to determine a type of a light source in another image of another object.

Figure 4:
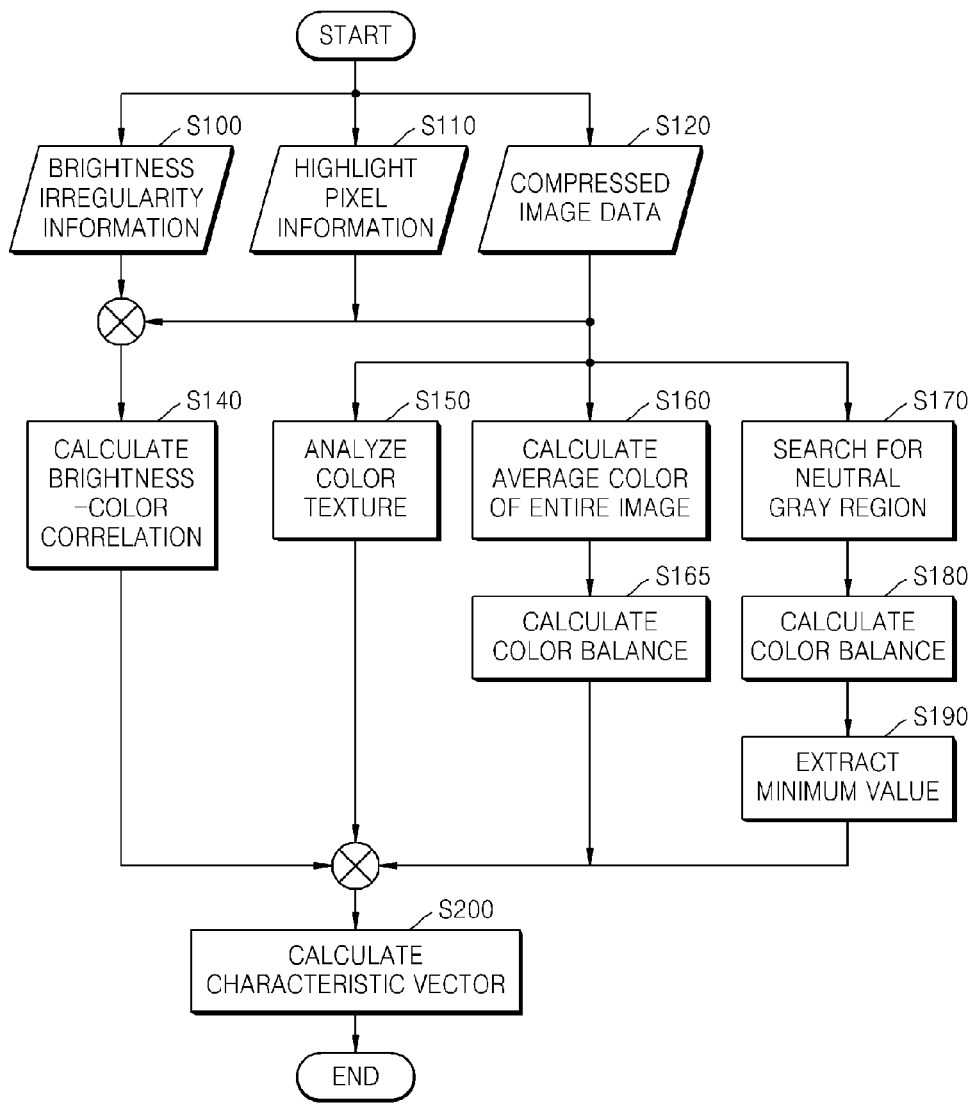
FIG. 4 is a flowchart of a process of calculating a characteristic vector, according to an exemplary embodiment.

With reference to FIG. 4, the process of calculating the characteristic vector in operation S50 will be described. FIG. 4 is a flowchart of a process of calculating a characteristic vector, according to an exemplary embodiment.

First, the characteristic amount calculator 204 obtains compressed image data of K frames that are input in a time sequence, brightness irregularity information corresponding to respective compressed image data, and highlight pixel information corresponding to the respective compressed image data from the brightness irregularity analyzer 203 (operations S100, S110, and S120). Then, the characteristic amount calculator 204 simultaneously performs a process of calculating brightness-color correlation, a process of analyzing color texture, a process of calculating a color balance of an entire image, and a process of calculating a color balance of a neutral gray region. According to the present embodiment, the process of calculating brightness-color correlation, the process of analyzing color texture, the process of calculating a color balance of an entire image, and the process of calculating a color balance of a neutral gray region are simultaneously performed. Alternatively, these processes may be sequentially performed.

[Calculating Brightness-Color Correlation (Operation S140)]

First, a process of calculating brightness-color correlation will be described.

The brightness-color correlation calculator 205 calculates a brightness-color correlation coefficient according to the compressed image data, brightness irregularity information corresponding to the compressed image data, and highlight pixel information corresponding to the compressed image data of each of K frames that are input in a time sequence (operation S140).

In this case, the compressed image data of K frames is used in order to stably calculate a correlation coefficient as described below. The correlation coefficient may not be stably calculated when data distribution is not normal distribution. When the number of image data used to calculate the correlation coefficient is small, it is not known whether the data distribution is normal distribution. Thus, the number of image data for calculating the correlation coefficient is ensured by using a plurality of image frames. Time sequence data is used to correspond to a temporal change in image information, which is caused by shake, a change in motion of an object in a scene, and a change in illumination.

In detail, the brightness-color correlation calculator 205 removes a region other than the constant brightness region and the highlight pixel from the compressed image data. This is because the brightness-color correlation coefficient is not stably calculated since brightness distribution of a captured image is very seriously irregular (shading) and data distribution of brightness and color is not normal distribution when a light source is inclined or when reflective characteristics of surfaces of objects are extremely different.

Then, the brightness-color correlation calculator 205 divides the compressed image data from which the region other than the constant brightness region and the highlight region are removed into N pieces (where N is an integer equal to or greater than 2) in horizontal and vertical directions. In this case, the divided region is called division block. For example, a pixel may be a one division block. In addition, the brightness-color correlation calculator 205 calculates an average value $R_i$ of a channel R, an average value $G_i$ of a channel G, and an average value $B_i$ of a channel B, for each respective division block i (i=1, 2, ..., N×K). In addition, the brightness-color correlation calculator 205 calculates brightness of each respective division block i according to Equation 1 below.

$$Lum_i = R_i + 2G_i + B_i \quad (1)$$

Then, the brightness-color correlation calculator 205 calculates a red degree $Redness_i$ of each respective division block i according to Equation 2 below.

$$Redness_i = \frac{R_i}{Lum_i} \quad (2)$$

Then, the brightness-color correlation calculator 205 calculates a blue degree $Blueness_i$ of each respective division block i according to Equation 3 below.

$$Blueness_i = \frac{B_i}{Lum_i} \quad (3)$$

Then, the brightness-color correlation calculator 205 calculates a correlation coefficient $F_r$ of brightness Lum and a red degree Redness according to Pearson's product moment correlation coefficient defined by Equation 4 below.

$$F_r = \frac{\sum_{i=1}^{n}(Lum_i - \overline{Lum})(Redness_i - \overline{Redness})}{\sqrt{\sum_{i=1}^{n}(Lum_i - \overline{Lum})^2}\sqrt{\sum_{i=1}^{n}(Redness_i - \overline{Redness})^2}} \quad (4)$$

Hereinafter, in order to indicate a character above which '–' is put in the equations, '–' is put in front of the character throughout this specification. 'n' is the number of image data, and n=N×K. (–)Lum is an average value of brightness Lum. (–)Redness is an average value of a red degree Redness.

In addition, the brightness-color correlation calculator 205 calculates a correlation coefficient $F_b$ of brightness Lum and a blue degree Blueness according to Pearson's product moment correlation coefficient defined by Equation 5 below.

$$F_b = \frac{\sum_{i=1}^{n}(Lum_i - \overline{Lum})(Blueness_i - \overline{Blueness})}{\sqrt{\sum_{i=1}^{n}(Lum_i - \overline{Lum})^2}\sqrt{\sum_{i=1}^{n}(Blueness_i - \overline{Blueness})^2}} \quad (5)$$

In this case, (–)Blueness is an average value of the blue degree Blueness.

Lastly, the brightness-color correlation calculator 205 determines the brightness-color correlation coefficient (F=($F_r$, $F_b$)). Pearson's product moment correlation coefficients defined by Equations 4 and 5 are used to calculate correlation coefficients. In this case, it is assumed that data distribution is normal distribution. Thus, a correct correlation coefficient may not be obtained when the number of image data is small or when there is an outlier. Thus, according to the present embodiment, the number of image data is sufficiently ensured in storing the compressed image data in a time sequence data buffer (operation S20). In addition, factors causing errors of calculating correlation coefficients may be reduced by removing a change in brightness in analyzing the brightness irregularity (operation S40) and the brightness pixel.

In addition, outliers may coexist in addition to these factors. For example, a self-emitting region may exist in a scene. In this case, since an outlier value may not be specified by analyzing a brightness irregularity, the data distribution may not likely be normal distribution. Thus, in this case, a Spearman rank-order correlation coefficient in which it is not assumed that data distribution is normal distribution may be used.

Figure 5A:
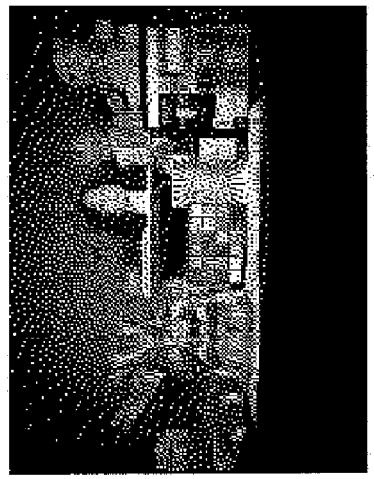
FIGS. 5A through 5C are an input image that is captured by irradiating light from a red light source to a general object and graphs showing correlation between brightness and color in the input image, according to an exemplary embodiment.
Figure 5B:
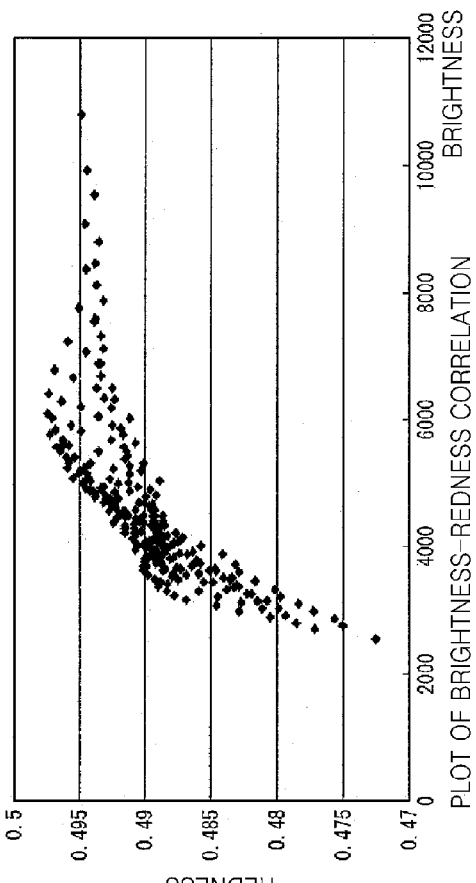
Figure 5C:
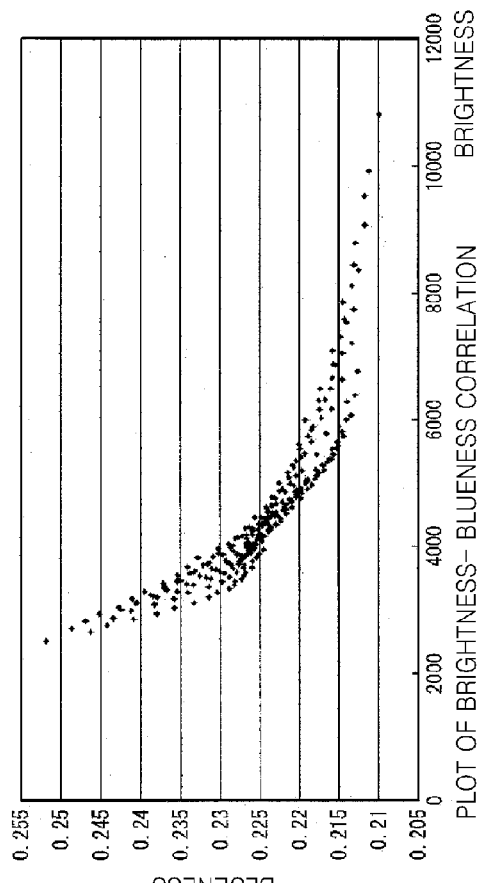

FIGS. 5A through 5C are an input image that is captured by irradiating light from a red light source to a general object and graphs showing correlation between brightness and color in the input image, according to an exemplary embodiment.

FIG. 5A shows the input image that is captured by irradiating light from a red light source (here, a halogen lamp) to a general object containing various colors. FIG. 5B is a graph showing a change in a red degree Redness with respect to brightness in the input image of FIG. 5A. In FIG. 5B, a vertical axis denotes a red degree Redness and a horizontal axis denotes brightness (Lum). As shown in FIG. 5B, the brightness Lum and the red degree Redness have a positive correlation. FIG. 5C is a graph showing a change in a blue degree Blueness with respect to brightness Lum in the input image of FIG. 5A. In FIG. 5C, a vertical axis denotes the blue degree Blueness and a horizontal axis denotes brightness Lum. As shown in FIG. 5C, the brightness Lum and the blue degree Blueness have a negative correlation.

Figure 6A:
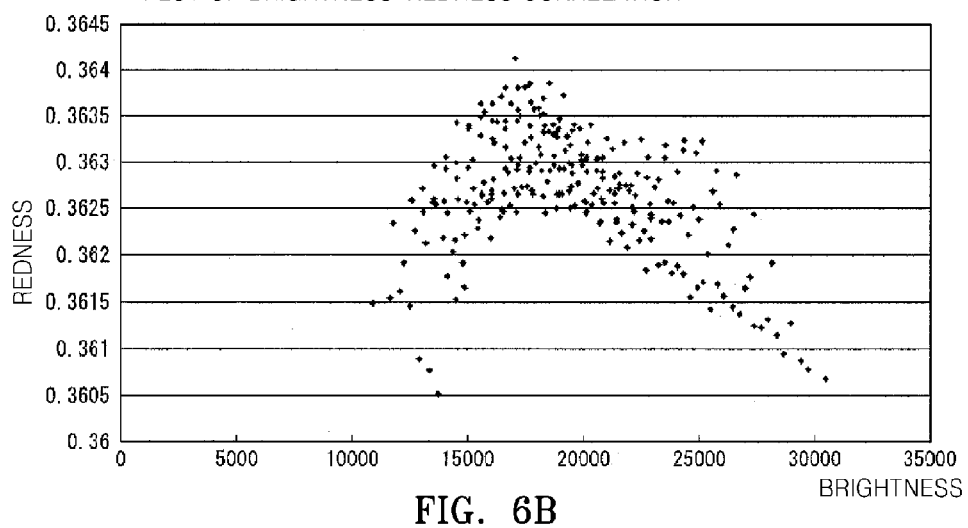
FIGS. 6A and 6B show a change in color with respect to brightness in an input image that is captured by irradiating light from a white light source to a general object having various colors, according to an exemplary embodiment.
Figure 6B:
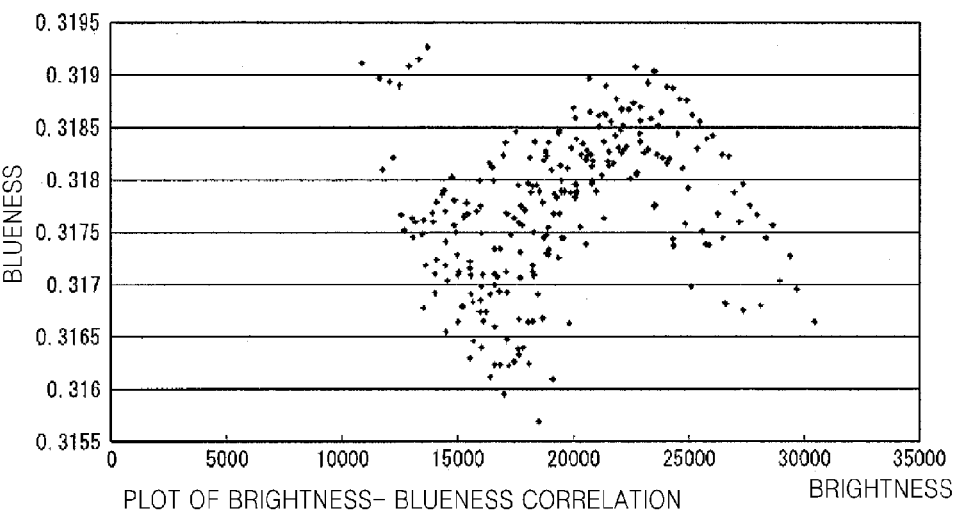

FIGS. 6A and 6B are graphs showing a correlation between brightness and color in an input image that is captured by irradiating light from a white light source to a general object.

FIGS. 6A and 6B show a change in color with respect to brightness in an input image H that is captured by irradiating light from a white light source (here, a white light source having a color temperature of 5,500 K) to a general object having various colors. FIG. 6A is a graph showing a change in a red degree Redness with respect to brightness Lum in the input image H. In FIG. 6A, a vertical axis denotes the red degree Redness and a horizontal axis denotes brightness Lum. As shown in FIG. 6A, the brightness Lum and the red degree Redness have no correlation. FIG. 6B shows a graph showing a change in a blue degree Blueness with respect to brightness Lum in the input image H. In FIG. 6B, a vertical axis denotes the blue degree Blueness and a horizontal axis denotes brightness Lum. As shown in FIG. 6B, the brightness Lum and the blue degree Blueness have no correlation.

Accordingly, it may be seen that brightness and color have correlation only when a red light source is used.

Figure 7:
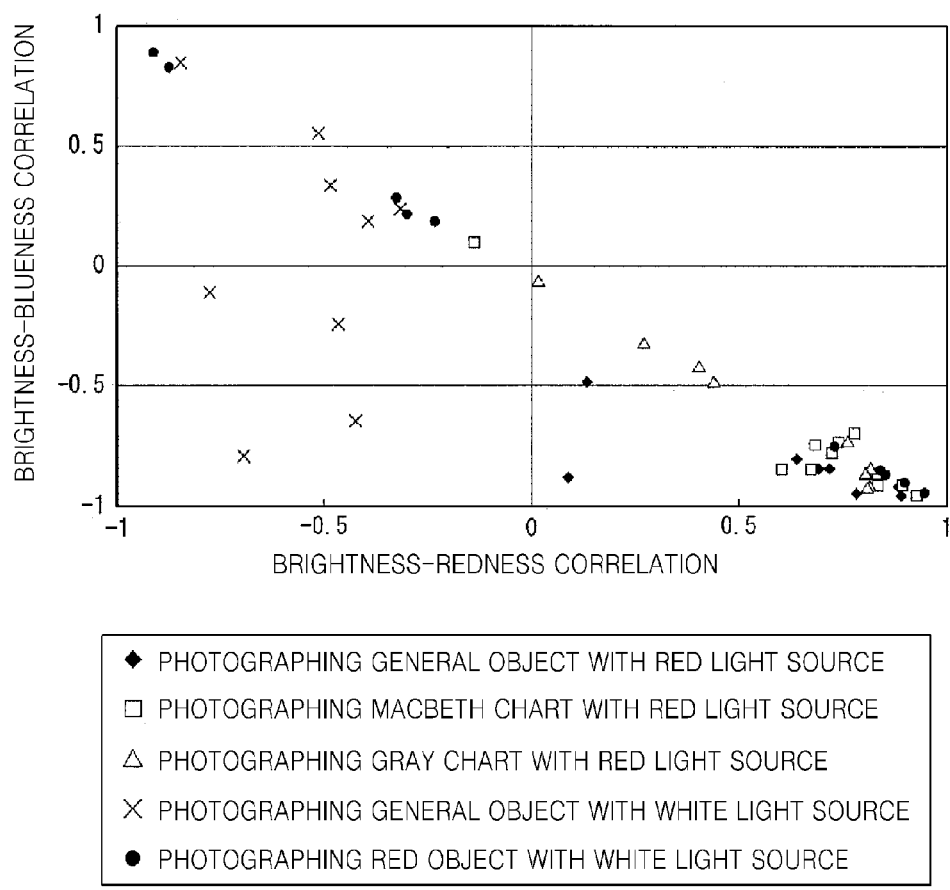
FIG. 7 is a graph of a two-dimensional scattering diagram showing brightness-color correlation coefficients, according to an exemplary embodiment.
Figure 9A:
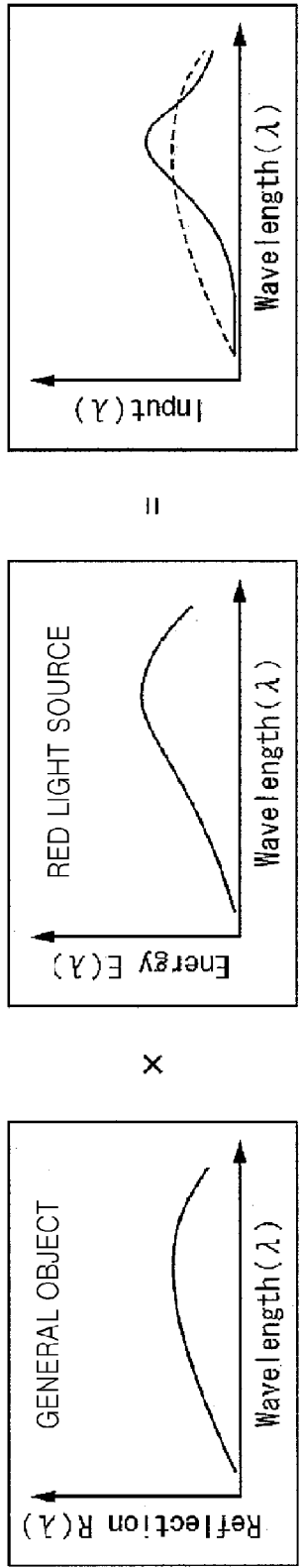
FIGS. 9A and 9B are schematic diagrams of spectral distribution for showing brightness-color correlation, according to an exemplary embodiment.
Figure 9B:
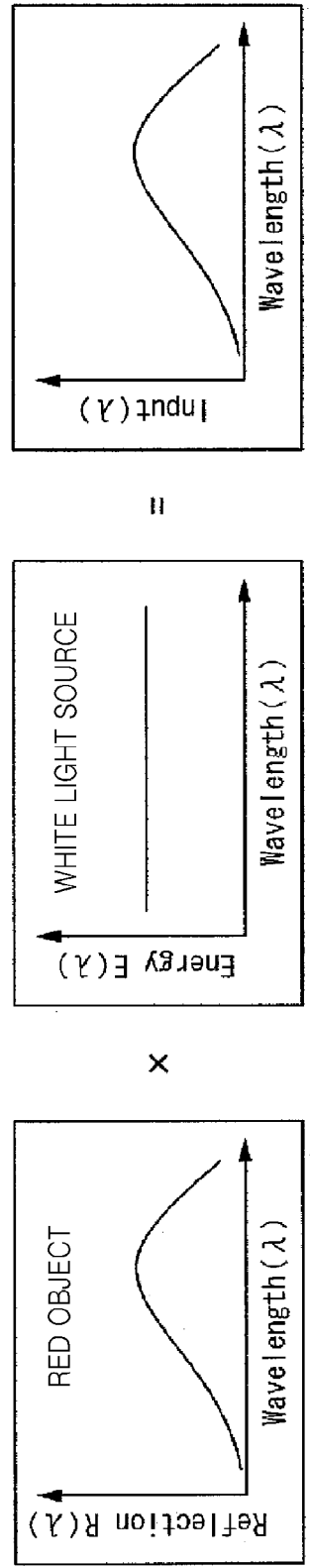

FIG. 7 is a graph of a two-dimensional scattering diagram showing brightness-color correlation coefficients, according to an exemplary embodiment.

In the graph of the two-dimensional scattering diagram, a horizontal axis denotes a correlation coefficient $F_r$ between brightness and a red degree and a vertical axis denotes a correlation coefficient $F_b$ between brightness and a blue degree. Plots have five examples, that is, three objects (an object having various colors, 24 color Macbeth color chart, and gray chart) photographed by irradiating light from a red light source and two objects (an object having various colors and a red object) photographed by irradiating light from a white light source. For each respective example, 10 images are captured at different places. As shown in FIG. 7, it may be seen that since objects that are captured by irradiating light from a red light source has a high brightness-redness correlation and a low brightness-blueness correlation, plots of the objects are concentrated on a lower-right region of the graph. In addition, it may be seen that plots of objects that are photographed by irradiating light from a white light source are scattered in a region other than the lower-right region. Thus, when the learning unit 212 may determine a boundary for detecting the lower-right region of the graph of FIG. 7, the learning unit 212 may determine that a plot belonging to the lower-right region corresponds to a red light source. However, in FIG. 7, plots corresponding to the red light source and plots corresponding to the white light source are mixed in the lower-right region. This may be because correlation coefficients are not stably calculated since the number of colors included in a textureless object is small, and a brightness-redness correlation is increased accidently even though light is irradiated from a white light source. Thus, in order to compensate for a brightness-color correlation characteristic, three characteristic amounts including a color texture characteristic, a color balance of an entire image, and a color balance of a neutral gray region may be introduced.

[Analyzing Color Texture (Operation S150)]

Referring back to FIG. 4, a process of analyzing color texture will now be described.

The texture analyzer 206 analyzes a color texture of the compressed image data of K frames that are input in a time sequence (operation S150). First, the texture analyzer 206 converts RGB signals of the compressed image data into HSV signals. H denotes hue, S denotes saturation, and V denotes brightness. Then, the texture analyzer 206 quantizes a H region in a quantization operation, and generates a histogram including L pieces. The histogram is referred to as h(i) (i=1, 2, . . . , L). The texture analyzer 206 calculates a relative histogram (p(i)) obtained by removing an influence of a pixel that is considered to be noise, that is, an extremely dark or bright pixel, according to Equation 6 below.

$$p(i) = \frac{h(i)}{M-e}, i = 0, \ldots, L \quad (6)$$

Here, M is the number of pixels included in the compressed image data and e is the number of pixels that are considered to be noise. Then, the texture analyzer 206 calculates entropy E according to Equation 7 below.

$$E = -\sum_{i=0}^{L-1} p(i)\log_2 p(i) \quad (7)$$

The entropy E is a color texture characteristic indicating color diversity. As shown in Equation 8 below, the entropy E has maximum entropy when the relative numbers (p(i)) of respective columns of the histogram are equal to each other. That is, as the number of colors contained in an image is increased, a shape of the histogram is further flattened. Thus, as the number of colors included in the image is increased, the entropy E is increased.

$$E_{max} = -\sum_{i=0}^{L-1} \frac{1}{L}\log_2 \frac{1}{L} \quad (8)$$

The reason why the entropy E of Equation 7 is used as a characteristic amount will now be described. As an extreme example, when an entire image includes a single color, plots between brightness and red degree (or blue degree) are concentrated on one point, and thus, a correlation coefficient between brightness and red degree (or blue degree) may not be calculated. When data distribution is not relatively wide, the correlation coefficient may not be calculated. This represents that the image needs to contain a plurality of colors. In addition, when an entire image includes a single color, it may not be determined whether the color is a color of an object itself, or the color is generated by a light source, even from optical spectrum characteristics of the light source or an object surface. Thus, indicators of color diversity, such as the entropy E of Equation 7, are required. The indicators of color diversity are not limited to the entropy E of Equation 7, and may be, for example, a variance value.

According to the present embodiment, the entropy E that is calculated by analyzing color textures is used as one factor of the characteristic vector. Alternatively, a weight of the correlation coefficient that is calculated by calculating the brightness-color correlation may be used. That is, a correlation coefficient of a pixel (or, a region) having high entropy may be considered to have high reliability, and a high weight may be put on the pixel. Then, the correlation coefficient may be transmitted to the identifying unit 215, and the identifying unit 215 may estimate the type of the light source.

[Calculating Color Balance of Entire Image (Operations S160 and S165)]

Next, a process of calculating a color balance of an entire image will be described.

First, the average color calculator 207 calculates an average value (–)R of a signal R, an average value (–)G of a signal G, and an average value (–)B of a signal B in the compressed image data in K frames (operation S160). Then, the color balance calculator 209 calculates the color balance (CBa= ((–)R/(–)G, (–)B/(–)G)) of the entire image (operation S165).

The color balance of the entire image is based on a gray hypotheses model (Non-patent Document 2 listed above). The gray hypotheses model is based on the concept that an entire image includes various colors and an average value of the colors is neutral gray. If the color balance deviates from the neutral gray, it is determined that the deviation is caused by a color of a light source. The gray hypotheses model is simple and is easily used. However, if a red block or red carpet is reflected in the entire image, the color balance of the entire image is close to red, thereby creating an illusion that color cast occurs. In order to address this problem, a color balance of a neutral gray region, as described below, is added to the characteristic amount.

[Calculating Color Balance of Neutral Grapy Region (Operations S170 to S190)]

Next, a process of calculating a color balance of a neutral gray region will be described.

First, the neutral gray region searcher 208 determines whether a neutral gray region exists in each frame (operation S170). In detail, the neutral gray region searcher 208 scans an image by using a rectangular window with a predetermined size. When there is a rectangular region that satisfies Equation 9 below, the neutral gray region searcher 208 determines that the neutral gray region exists. When there is no rectangular region that satisfies Equation 9 below, the neutral gray region searcher 208 determines that the neutral gray region does not exist.

$$\text{abs}\left(1 - \frac{\overline{R}_{i,j}}{\overline{G}_{i,j}}\right) + \text{abs}\left(1 - \frac{\overline{B}_{i,j}}{\overline{G}_{i,j}}\right) < TH \tag{9}$$

In Equation 9, i denotes an x coordinate value of the compressed image data, and j denotes a y coordinate value of the compressed image data. (–)Ri,j is an average channel of a channel R within one rectangular region with respect to coordinate values (i, j). (–)Gi,j is an average value of a channel G within one rectangular region with respect to coordinate values (i, j). (–)Bi,j is an average channel of a channel B within one rectangular region with respect to coordinate values (i, j).

Then, the color balance calculator 209 calculates a color balance C of a frame that is determined to contain the neutral gray region by the neutral gray region searcher 208, according to Equation 10 below (operation S180).

$$C = \min_{i,j \in D}\left(\text{abs}\left(1 - \frac{\overline{R}_{i,j}}{\overline{G}_{i,j}}\right) + \text{abs}\left(1 - \frac{\overline{B}_{i,j}}{\overline{G}_{i,j}}\right)\right) \tag{10}$$

Here, D is an image region of the compressed image data. The color balance calculator 209 extracts a minimum value of the color balance C of each frame, and sets the extracted minimum value as a color balance CBn of the neutral gray region (operation S190).

The color balance of the neutral gray region is a characteristic amount for supporting the gray hypotheses and brightness-color correlation principle. According to the gray hypotheses, if a red block or red carpet is reflected in the entire image, the color balance of the entire image is close to red, thereby creating an illusion that color cast occurs. In this case, if there is a region whose color balance is at least partially neutral gray (for example, a region through which a concrete surface is at least partially shown), it may be expected that red color of the red block or red carpet is of an object itself. On the other hand, if color cast occurs due to a light source, the neutral gray region may also exhibit red. In order to distinguish these situations, the neutral gray region searcher 208 searches for the neutral gray region according to Equation 9.

The characteristic amount (the color balance of the neutral gray region) may also be effectively used in a case where the number of color textures of an image is small. Thus, when the entropy E obtained by analyzing the color texture is small, that is, when the image is textureless, the identifying unit 215 puts a high weight on the color balance of the neutral gray region, but puts a low weight on the brightness-color correlation coefficient. Thus, a method of estimating a type of light source may not be dependent upon textures of a scene.

According to the present embodiment, the neutral gray region searcher 208 searches for the neutral gray region by scanning the rectangular window within an image. In this case, when the rectangular window being scanned contacts with a region whose color contacts with the neutral gray region or when the neutral gray region does not exist in any frame of a moving picture, an operation of detecting a frame in which the rectangular region belongs to the neutral gray region may be required. The operation corresponds to operation S190 of extracting the minimum value, as described above.

[Calculating Characteristic Vector (Operation S200)]

Lastly, the characteristic vector calculator 210 calculates the characteristic vector (V=(brightness-color correlation coefficient F, color texture characteristic E, a color balance CBa of an entire image, and a color balance CBn of neutral gray region)), thereby completing the process (operation S200). According to the present embodiment, the four characteristic amounts are referred to as the characteristic vector. Alternatively, at least the brightness-color correlation coefficient F, the color balance CBa of an entire image, and the color balance CBn of the neutral gray region may be included in the characteristic vector.

FIG. 8 is a graph showing three-dimensional plots of a characteristic vector, according to an exemplary embodiment.

In FIG. 8, three axes are a correlation coefficient $F_r$ between brightness and a red degree, a color balance CBa of an entire image, and a color balance CBn of a neutral gray region, respectively. Plots have five examples, that is, three objects (an object having various colors, 24 color Macbeth color chart, and gray chart) photographed by irradiating light from a red light source and two objects (an object having various colors and a red object) photographed by irradiating light from a white light source. For each respective example, 10 images are captured at different places. As shown in FIG. 8, it may be seen that plots corresponding to a red light source and plots corresponding to a white light source are easily distinguished from each other by adding the color balance CBa of the entire image and the color balance CBn of the neutral gray region to the correlation coefficient $F_r$ between brightness and a red degree.

According to the present embodiment, the characteristic amount calculator 204 collects and sets the four characteristic amounts (brightness-color correlation coefficient, color texture characteristic, color balance of entire image, and color balance of neutral gray region) as the characteristic vector. The identifying unit 215 identifies the type of the light source. Thus, since the white balance gain calculator 111 may calculate appropriate white balance for each respective type of a light source, color feria may be reduced.

A type of a light source may be estimated or a characteristic vector may be calculated by recording programs for executing the operations shown in FIGS. 3 and 4 in a computer readable recording medium having recorded thereon the program and reading the program recorded on the recording medium by using a computer system. Here, the 'computer system' may include an operating system (OS) or hardware such as a peripheral device.

When the 'computer system' uses a 'WWW' system, the computer system may include an environment for providing homepages.

The 'computer readable recording medium' refers to a memory device such as a non-volatile memory, for example, a flexible disc, an optical magnetic disc, or a read only memory (ROM), a portable medium such as CD-ROM, a hard disc embedded in the computer system, or the like.

The 'computer readable recording medium' includes a device for storing a program for a predetermined period of time, such as a volatile memory (e.g., a dynamic random access memory (DRAM)) installed in a computer system as a server or a client when the program is transmitted through a network such as the Internet or a communication line such as a telephone circuit.

The program may be transmitted from the computer system that stores the program in a memory device or the like to another computer system through a transmitting medium or by a modulating wave of the transmitting medium. In this case, the 'transmitting medium' for transmitting the program is a medium having a function of transmitting information, such as a network such as the Internet or a communication circuit (communication line) such as a telephone circuit.

The program may partially embody the above-described function and may embody the above-described function by using a combination with a program that is recorded in the computer system, that is, a differential file (a differential program).

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

According to one or more embodiments, a brightness-color correlation principle and applications have been described with respect to a red light source. Alternately, a light source including many green components, such as a fluorescent lamp, or a light source having a high color temperature and including many blue components, such as sunlight, may be used.

In addition, the white balance adjusting apparatus 1 may be used to search for an image in an electronic image storing apparatus such as a hard disc recorder or to adjust image quality according to external light in an electronic imaging device.

According to one or more embodiments, a type of a light source may be determined according to color texture characteristics, a color balance of an entire image, and a color balance of a neutral gray region in addition to correlation coefficients between brightness and color. Thus, even if color textures of an image are flat and the number of colors is small, the type of the light source may be very accurately calculated by using a small number of calculating operations.

What is claimed is:

1. A light source estimating apparatus comprising:
 a brightness-color correlation calculator which calculates brightness-color correlation data from an image of an object generated from at least one image frame;
 a color balance calculator which calculates a color balance of an entire region of the image and a color balance of a neutral gray region of the image having an average color of gray;
 a characteristic data generating unit which generates characteristic data of the image based on the brightness-color correlation data, the color balance of the entire region and the color balance of the neutral gray region; and
 an identifier which determines a type of a light source in the image, based on the characteristic data of the image.

2. The light source estimating apparatus of claim 1, further comprising a texture analyzing unit which calculates a color texture characteristic indicating color diversity of the image,
 wherein the characteristic data generating unit generates the characteristic data of the image based on the color texture characteristic of the image.

3. The light source estimating apparatus of claim 1, further comprising a brightness irregularity analyzer which specifies a constant brightness region having constant brightness in the image,
 wherein the brightness-color correlation calculator calculates the brightness-color correlation data in the constant brightness region in the image.

4. The light source estimating apparatus of claim 1, wherein the identifier comprises:
 a learning unit which learns a determination basis for extracting the type of the light source from the characteristic data of the image, based on learning data comprising learned characteristic data of a plurality of model images and types of light sources corresponding to the plurality of model images, respectively; and an identifying unit which determines the type of the light source corresponding to the characteristic data of the image, based on a result of the learning by the learning unit.

5. The light source estimating apparatus of claim 4, wherein the identifying unit determines the type of the light source by comparing the characteristic data of the image with the learned characteristic data of the plurality of model images, selects learned characteristic data of a model image most similar to the characteristic data of the image, and determines a type of a light source corresponding to the selected learned characteristic data of the model image as the type of the light source in the image.

6. The light source estimating apparatus of claim 5, wherein the characteristic data of the image and the type of the light source in the image becomes one of the learned characteristic data of the plurality of model images constituting the learning data which is used for determining a type of a light source in another image of another object.

7. The light source estimating apparatus of claim 1, wherein the identifier determines the type of the light source by applying different weights to the brightness-color correlation data and the color balance of the entire region of the image based on a number of colors detected in the image.

8. The light source estimating apparatus of claim 1, wherein the brightness-color correlation calculator calculates the brightness-color correlation data from the image of the object generated from a plurality of image frames obtained sequentially with respect to the same object.

9. The light source estimating apparatus of claim 1, wherein the image of the object generated from at least one image frame from which the brightness-color correlation calculator calculates the brightness-color correlation data is image data which is compressed or reduced from original image data of the object obtained by an imaging device.

10. The light source estimating apparatus of claim 1, wherein the type of the light source comprises a color of the light source.

11. A method of estimating a light source, the method comprising:
calculating brightness-color correlation data from an image of an object generated from at least one image frame;
calculating a color balance of an entire region of the image and a color balance of a natural gray region of the image having an average color or gray;
generating characteristic data of the image based on the brightness-color correlation data, the color balance of the entire region and the color balance of the neutral gray region; and
determining a type of a light source in the image, based on the characteristic data of the image.

12. The method of claim 11, further comprising calculating a color texture characteristic indicating color diversity of the image,
wherein the characteristic data is generated further based on the color texture characteristic.

13. The method of claim 11, further comprising specifying a constant brightness region having constant brightness in the image,
wherein the brightness-color correlation data is calculated with respect to the constant brightness region.

14. The method of claim 11, wherein the determining the type of the light source in the image comprises:
learning a determination basis for extracting the type of the light source from the characteristic data of the image, based on learning data comprising learned characteristic data of a plurality of model images and types of light sources corresponding to the plurality of images, respectively; and
determining the type of the light source corresponding to the characteristic data of the image, based on a result of the learning.

15. The method of claim 14, wherein the determining the type of the light source comprises:
comparing the characteristic data of the image with the learned characteristic data of the plurality of model images;
selecting learned characteristic data of a model image most similar to the characteristic data of the image; and
determining a type of a light source corresponding to the selected learned characteristic data of the model image as the type of the light source in the image.

16. The method of claim 15, wherein the characteristic data of the image and the type of the light source in the image becomes one of the learned characteristic data of the plurality of model images constituting the learning data which is used for determining a type of a light source in another image of another object.

17. The method of claim 11, wherein the determining the type of the light source comprises applying different weights to the brightness-color correlation data and the color balance of the entire region of the image based on a number of colors detected in the image.

18. The method of claim 11, wherein the brightness-color correlation data is calculated from the image of the object generated from a plurality of image frames obtained sequentially with respect to the same object.

19. The method of claim 11, wherein the image of the object generated from at least one image frame from which the brightness-color correlation data is calculated is image data which is compressed or reduced from original image data of the object obtained by an imaging device.

20. The method of claim 11, wherein the type of the light source comprises a color of the light source.

* * * * *